(12) United States Patent
Kedarisetti et al.

(10) Patent No.: US 11,386,713 B2
(45) Date of Patent: Jul. 12, 2022

(54) ANOMALOUS POSE DETECTION METHOD AND SYSTEM

(71) Applicant: MOTOROLA SOLUTIONS, INC., Chicago, IL (US)

(72) Inventors: Dharanish Kedarisetti, Somerville, MA (US); Teresa Dankel, Lexington, MA (US); Patrick Henson, Bedford, MA (US); Aral Sarrafi, Lowell, MA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 210 days.

(21) Appl. No.: 16/868,219

(22) Filed: May 6, 2020

(65) Prior Publication Data

US 2021/0350117 A1    Nov. 11, 2021

(51) Int. Cl.
*G06V 40/20* (2022.01)
*G06T 7/73* (2017.01)
*G06K 9/62* (2022.01)
*G06V 10/25* (2022.01)
*G06V 40/10* (2022.01)

(52) U.S. Cl.
CPC .......... *G06V 40/20* (2022.01); *G06K 9/6223* (2013.01); *G06K 9/6276* (2013.01); *G06T 7/74* (2017.01); *G06V 10/25* (2022.01); *G06V 40/103* (2022.01); *G06T 2207/20081* (2013.01); *G06T 2207/20084* (2013.01); *G06T 2207/30196* (2013.01)

(58) Field of Classification Search
CPC ...... G06V 10/25; G06V 40/103; G06V 40/20; G06K 9/6276; G06K 9/6223; G06T 2207/20084; G06T 2207/20081; G06T 2207/30196; G06T 7/74
See application file for complete search history.

(56) References Cited

U.S. PATENT DOCUMENTS 9,904,845 B2   2/2018   Dariush et al.
10,033,979 B2  7/2018   Kanaujia et al.
(Continued)

FOREIGN PATENT DOCUMENTS

WO    2018162929 A1    9/2018

OTHER PUBLICATIONS

Angelini Federico et al: "Joint RGB-Pose Based Human Action Recognition for Anomaly Detection Applications", 2019 22th International Conference on Information Fusion (Fusion), ISIF—International Society of Information Fusion, Jul. 2, 2019 (Jul. 2, 2019). pp. 1-7.
(Continued)

*Primary Examiner* — Pinalben Patel

(57) ABSTRACT

A method of detecting anomalous poses is provided, including: detecting an object of interest in a field of view of a video camera; generating, by a neural network, a pose vector associated with a pose of the object; comparing the pose vector to one or more clusters of pose vectors in a dataset of pose vectors, each cluster of pose vectors comprising one or more pose vectors generated from poses of objects; determining a value associated with the similarity of the pose vector to at least one of the one or more pose vectors in the cluster; comparing the value to a predetermined value; and based on the comparison of the value, adding the pose vector to the dataset or generating an alert.

13 Claims, 13 Drawing Sheets

(56) References Cited

U.S. PATENT DOCUMENTS

| | | | | |
|---|---|---|---|---|
| 2012/0056800 A1* | 3/2012 | Williams | ............ | G06V 40/103 345/156 |
| 2016/0093084 A1* | 3/2016 | Sumner | ............... | G06K 9/6218 345/473 |
| 2016/0180183 A1* | 6/2016 | Bourdev | ............... | G06V 10/82 382/115 |
| 2020/0193552 A1* | 6/2020 | Turkelson | ............ | G06K 9/6232 |
| 2021/0092325 A1* | 3/2021 | Xu | ......................... | H04N 7/188 |

OTHER PUBLICATIONS

The International Search Report and the Written Opinion corresponding patent application No. PCT/US2021/029092, filed: Apr. 26, 2021, dated Jul. 23, 2021, all pages.

Mona Fathollahi Ghezelghieh; Rangachar Kasturi; Sudeep Sarkar: "Learning Camera Viewpoint Using CNN to Improve 3D Body Pose Estimation", 2016 Foruth International Conference on 3D Vision (3DV), Oct. 25-28, 2016, IEEE, Stanford, CA, USA, DOI: 10.1109/3DV.2016.75, all pages.

Kai-Chi Chan, Cheng-Kok Koh; C.S. George Lee: "An Automatic Design of Factors in a Human-Pose Estimation System Using Neural Networks", IEEE Transactions on Systems, Man, and Cybernetics: Systems ( vol. 46 , Issue: 7 , Jul. 2016 ), pp. 875-887.

Kai-Chi Chan, Cheng-Kok Koh; C.S. George Lee: "Human-pose estimation with neural-network realization", 2015 IEEE/RSJ International Conference on Intelligent Robots and Systems (IROS), Sep. 28-Oct. 2, 2015, all pages.

Anbhav Singh et al: "Human Pose Estmation Using Convolutional Neural Networks", 2019 Amity International Conference on Artificial Intelligence (AICAI) (pp. 946-952).

Deep Track: A Video Content Analysis System, ip.com Disclosure No. IPCOM000250598D Publication Date: Aug. 7, 2017 downloaded: Feb. 5, 2020, all pages.

\* cited by examiner

ANOMALOUS POSE DETECTION METHOD AND SYSTEM

BACKGROUND

Analysis of security video is useful to review and identify events found in the video captured by video cameras. To assist review of video, a video may be subject to analysis to extract and associate information about objects from the images of the video. This information may then be subject to searches and/or used to define events of interest that may then be used to highlight the video (or certain portions thereof), such as to security personnel. However, there is often a large amount of video (typically recording normal, uneventful scenes), making it impracticable, if not impossible, to review by personnel. It would assist reviewers of such recorded video to be able to quickly identify anomalies that may have occurred.

In a video camera security system, there may be a large number of cameras that are each generating its own video feed, which can further make the simultaneous viewing of these video feeds by security personnel cumbersome. It would assist such security personnel if alerts and/or indications are generated in real-time to highlight detected anomalies in any of the videos.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
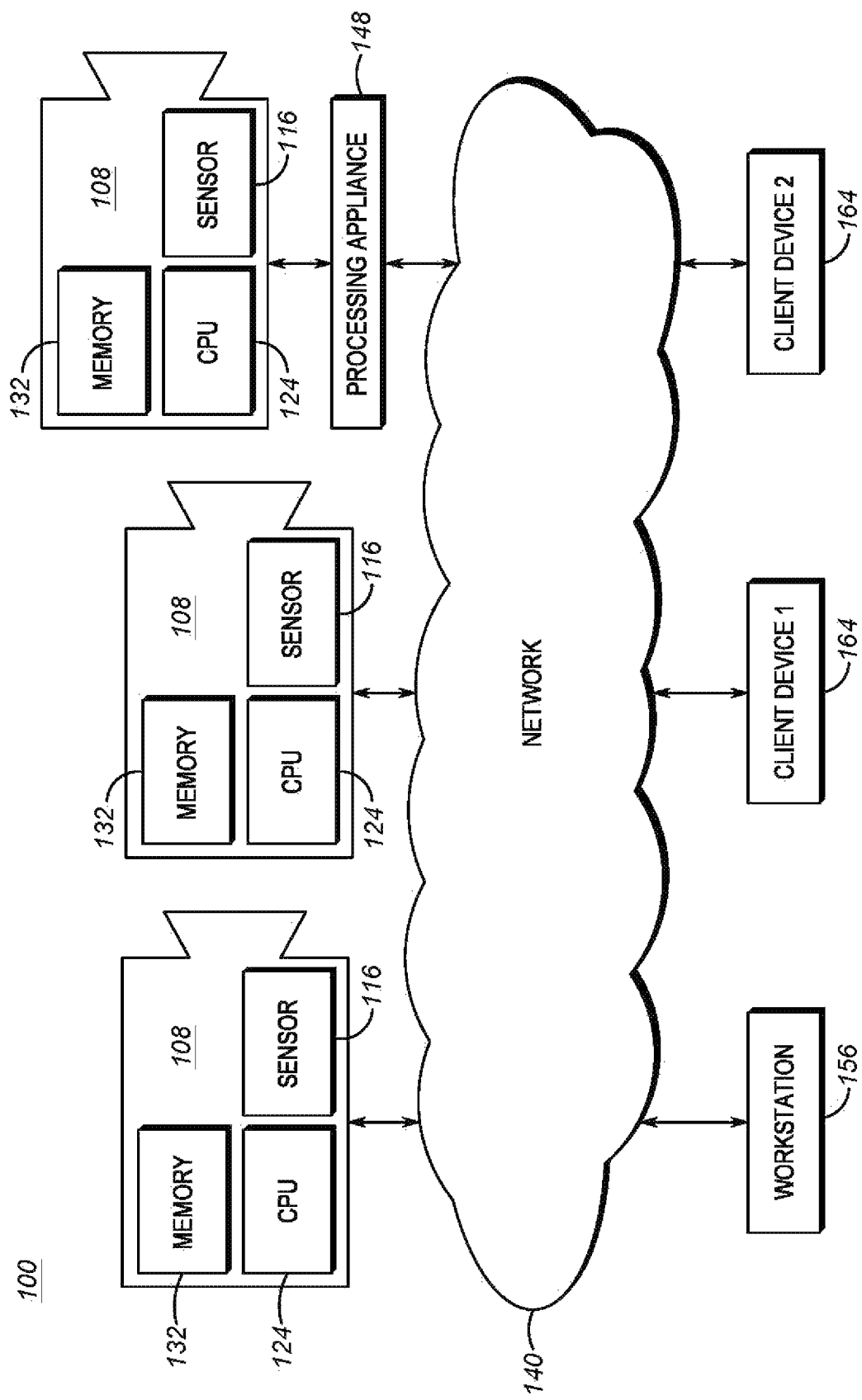
FIG. 1 is a block diagram of connected devices of a video security system according to an example embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Herein provided is an anomalous pose detection method and system.

The embodiments described herein provide novel approaches to anomaly pose detection in video. The anomaly detection may detect anomalies of a scene using metadata of the video. Although not required, the anomaly detection can be performed separately form metadata generation. Thus, the anomaly detection may be performed in real time using metadata extracted contemporaneously with the recording of the video, or may be performed with respect to previously recorded video (e.g., taken days, months, years before).

According to an aspect, there is provided a method of detecting anomalous poses, comprising: detecting a living object of interest in a field of view of a video camera; generating, by a neural network, a pose vector associated with a pose of the living object of interest; comparing the pose vector of the living object of interest to one or more clusters of pose vectors, each cluster of pose vectors comprising one or more pose vectors generated from poses of living object found in the field of view of the video camera; determining if the pose vector of the living object is similar to at least one of the one or more pose vectors comprising a cluster of pose vectors; and if the pose vector of the living object is similar to at least one of the one or more pose vectors comprising a cluster of pose vectors, adding the pose vector to the cluster of pose vectors; and if not, generating an alert.

Determining if the pose vector of the living object is similar to at least one of the one or more pose vectors may comprise determining an Euclidean distance. The Euclidean distance may be determined using the pose vector of the living object of interest and a cluster center of each of the clusters of pose vectors. If the pose vector of the living object of interest is added to a cluster of the one or more clusters of pose vectors, the cluster center of the cluster may be recalculated. The one or more clusters of pose vectors may be formed using k-means clustering of a plurality of pose vectors. Each of the one or more clusters may be associated with a label. The pose vector of the living object of interest may be associated with a time, and each of the one or more clusters of pose vectors are associated with a time period, and if the time is outside the time period associated a cluster, the cluster is not compared to the pose vector of the living object.

According to another aspect, there is provided a system comprising: a display; an input device; a processor communicatively coupled to the display and the input device; and a memory communicatively coupled to the processor and having stored thereon computer program code that is executable by the processor, wherein the computer program code, when executed by the processor, causes the processor to detect a living object of interest in a field of view of a video camera; generate, by a neural network, a pose vector associated with a pose of the living object of interest; compare the pose vector of the living object of interest to one or more clusters of pose vectors, each cluster of pose vectors comprising one or more pose vectors generated from poses of living object of interest found in the field of view of the video camera; determine if the pose vector of the living object of interest is similar to at least one of the one or more pose vectors comprising a cluster of pose vectors; and if the pose vector of the living object is similar to at least one of the one or more pose vectors comprising a cluster of pose vectors, add the pose vector to the cluster of pose vectors; and if not, generate an alert.

The determination if the pose vector of the living object of interest is similar to at least one of the one or more pose vectors may comprise determining an Euclidean distance. The Euclidean distance may be determined using the pose vector of the living object of interest and a cluster center of each of the clusters of pose vectors. The pose vector of the living object of interest may be added to a cluster of the one or more clusters of pose vectors, and the cluster center of the cluster recalculated. The one or more clusters of pose vectors may be formed using k-means clustering of a plurality of pose vectors. Each of the one or more clusters of pose vectors may be associated with a label. The pose vector of the living object of interest may be associated with a time, and each of the one or more clusters of pose vectors are associated with a time period, and if the time is outside the time period associated a cluster, the cluster is not compared to the pose vector of the living object.

According to another aspect, there is provide a method of training a system using a neural network comprising: detecting a plurality of living objects of interest in a field of view of a video camera; for each of the living objects of interest of the plurality of living objects of interest, generating, by the neural network, a pose vector associated with a pose of the living object of interest thereby generating a plurality of pose vectors; clustering the plurality of pose vectors into one or more clusters based on a similarity of the pose vectors associated with the plurality of living objects; and for each of the one or more clusters of pose vectors, determining a cluster center and a radius.

The similarity of the pose vectors may be based on an Euclidean distance. The clustering the plurality of pose vectors may use k-means clustering. Each of the one or more clusters may be associated with a label. Each of the one or more clusters is associated with a time period.

According to another aspect, there is provided a method of detecting anomalous poses, comprising: detecting a living object of interest in a field of view of a video camera; generating, by a neural network, a pose vector associated with a pose of the living object of interest; comparing the pose vector of the living object of interest to one or more clusters of pose vectors in a dataset of pose vectors, each cluster of pose vectors comprising one or more pose vectors generated from poses of living objects found in the field of view of the video camera; determining a value associated with the similarity of the pose vector of the living object to at least one of the one or more pose vectors comprising a cluster of pose vectors; comparing the value associated with the similarity of the pose vector of the living object to at least one of the one or more pose vectors comprising a cluster of pose vectors to a predetermined value; and based on the comparison of the value associated with the similarity of the pose vector of the living object to at least one of the one or more pose vectors comprising a cluster of pose vectors to a predetermined value, adding the pose vector to the dataset or generating an alert.

Determining the value associated with the similarity of the pose vector of the living object to at least one of the one or more pose vectors comprising a cluster of pose vectors may comprise determining an Euclidean distance. The Euclidean distance may be determined using the pose vector of the living object of interest and a cluster center of each of the clusters of pose vectors. If the pose vector of the living object of interest is added to the dataset, the pose vector may be added to a cluster of the one or more clusters of pose vectors, and the cluster center of the cluster recalculated.

The determining the value associated with the similarity of the pose vector of the living object to at least one of the one or more pose vectors comprising a cluster of pose vectors may comprise determining a reachability distance and the reachability distance may be determined using the pose vector of the living object of interest and its nearest neighboring pose vectors in each of the clusters of pose vectors.

The determining the value associated with the similarity of the pose vector of the living object to at least one of the one or more pose vectors comprising a cluster of pose vectors may comprise determining a probability of the pose vector of the living object belonging to the cluster and may use an expectation maximization algorithm.

According to another aspect, there is provided a system comprising: a display; an input device; a processor communicatively coupled to the display and the input device; and a memory communicatively coupled to the processor and having stored thereon computer program code that is executable by the processor, wherein the computer program code, when executed by the processor, causes the processor to detect a living object of interest in a field of view of a video camera; generate, by a neural network, a pose vector associated with a pose of the living object of interest; compare the pose vector of the living object of interest to one or more clusters of pose vectors in a dataset of pose vectors, each cluster of pose vectors comprising one or more pose vectors generated from poses of living objects found in the field of view of the video camera; determine a value associated with the similarity of the pose vector of the living object to at least one of the one or more pose vectors comprising a cluster of pose vectors; compare the value associated with the similarity of the pose vector of the living object to at least one of the one or more pose vectors comprising a cluster of pose vectors to a predetermined value; and based on the comparison of the value associated with the similarity of the pose vector of the living object to at least one of the one or more pose vectors comprising a cluster of pose vectors to a predetermined value, add the pose vector to the dataset or generating an alert.

According to another aspect, there is provided a system comprising: a display; an input device; a processor communicatively coupled to the display and the input device; and a memory communicatively coupled to the processor and having stored thereon computer program code that is executable by the processor, wherein the computer program code, when executed by the processor, causes the processor to perform the methods described above.

According to another aspect, there is provided a non-transitory computer readable medium having stored thereon computer program code that is executable by a processor and that, when executed by the processor, causes the processor to perform the methods described above.

Each of the above-mentioned embodiments will be discussed in more detail below, starting with example communication system and device architectures of the system in which the embodiments may be practiced, followed by an illustration of processing blocks for achieving an improved technical method, device, and system for an anomalous pose detection method and system. Example embodiments are herein described with reference to flowchart illustrations and/or block diagrams of methods, apparatus (systems) and computer program products according to example embodiments. It will be understood that each block or entry of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to FIG. 1, therein illustrated is a block diagram of connected devices of a video security system 100 according to an example embodiment. The video security system 100 includes hardware and software that perform the processes and functions described herein.

The video security system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD image sensor.

The at least one image sensor 116 may be operable to sense light in one or more frequency ranges. For example, the at least one image sensor 116 may be operable to sense light in a range that substantially corresponds to the visible light frequency range. In other examples, the at least one image sensor 116 may be operable to sense light outside the visible light range, such as in the infrared and/or ultraviolet range. In other examples, the video capture device 108 may be a multi-sensor camera that includes two or more sensors that are operable to sense light in different frequency ranges.

The at least one video capture device 108 may include a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another video capture device 108. For example, the dedicated camera may be a security camera, such as any one of a box, pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors, and one or more network interfaces. The memory device can include a local memory (e.g. a random access memory and a cache memory) employed during execution of program instructions. The processor executes computer program instruction (e.g., an operating system and/or application programs), which can be stored in the memory device.

In various embodiments the processor 124 may be implemented by any processing circuit having one or more circuit units, including a central processing unit (CPU), digital signal processor (DSP), graphics processing unit (GPU) embedded processor, a video processing unit, or a vision processing unit (both referred to as VPU), etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may also include memory and be in wired communication with the memory circuit, for example. Processor 124 may include one or more Artificial Intelligence (AI) and Machine Learning (ML) systems. For example, in some embodiments, one or more neural networks, such as a convolutional neural networks (CNNs), may be present on processor 124.

Other AI and ML systems that may be used herein may include, but are not limited to, Linear Regression techniques, Logistic Regression techniques, Decision Trees, SVM, Naive Bayes techniques, k-nearest neighbor techniques, K-Means clustering, Random Decision Forest techniques, Dimensionality Reduction Algorithms, various Gradient Boosting algorithms, such as Gradient Boosting Machine techniques, Extreme Gradient Boosting algorithms, Light Gradient Boosting Machine algorithms, or Gradient Boosting algorithms with categorical features, Apriori algorithms, Markov Decision Processes, and various neural networks, such Feedforward Neural Networks, Artificial Neuron Models, Radial Basis Function Neural Networks, Multilayer Perceptron networks, Deep Convolutional Neural Networks, Deconvolutional Neural Networks, Deep Convolutional Inverse Graphics Networks, Generative Adversarial Networks, Recurrent Neural Networks, Long/Short Term Memory techniques, Modular Neural Networks, Sequence-To-Sequence Models, Liquid State Machines, Extreme Learning Machines, Deep Residual Networks, Kohonen Networks, Support Vector Machines, or Neural Turing Machines.

In various example embodiments, the memory device 132 coupled to the processor circuit is operable to store data and computer program instructions. Typically, the memory device formed from one or more integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, dynamic random access memory (DRAM) universal serial bus (USB) connected memory units, magnetic storage, optical storage, magneto-optical storage, etc. or any combination thereof, for example. The memory device may be a volatile memory, a non-volatile memory, or a combination thereof.

In various example embodiments, a plurality of the components of the video capture device 108 may be implemented together within a system on a chip (SOC). For example, the processor 124, the memory 132 and the network interface may be implemented within a SOC. Furthermore, when implemented in this way, both a general purpose processor and DSP may be implemented together within the SOC.

Continuing with FIG. 1, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g. WAN, the Internet) or a combination thereof. In other examples, the network 140 may include a cloud network.

In some examples, the video security system 100 includes a processing appliance 148. The processing appliance 148 is operable to process the image data outputted by a video capture device 108. The processing appliance 148 may be a computer and include one or more processor and one or more memory devices coupled to the processor. The processing appliance 148 may also include one or more network interfaces.

For example, and as illustrated, the processing appliance 148 is connected to a video capture device 108. The processing appliance 148 may also be connected to the network 140.

According to one exemplary embodiment, and as illustrated in FIG. 1, the video security system 100 includes at least one workstation 156 (e.g. server), each having one or more processors. The at least one workstation 156 may also include storage (memory). The workstation 156 receives image data from at least one video capture device 108 and performs processing of the image data. The workstation 156 may send commands for managing and/or controlling one or more of the video capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. For example, the workstation 156 may also receive metadata with the image data from the video capture devices 108 and perform further processing of the image data.

It will be understood that while a single workstation 156 is illustrated in FIG. 1, the workstation may be implemented as an aggregation of a plurality of workstations.

The video security system 100 further includes at least one client device 164 connected to the network 140. The client device 164 is used by one or more users to interact with the video security system 100. Accordingly, the client device 164 includes a user interface including at least one display device (a display) and at least one user input device (e.g. mouse, keyboard, touchscreen). The client device 164 is operable to display on its display device various information, to receive various user input, and to play back recorded video including near real time video received from the video capture devices 108. Near real time video means the display depicts video of an event or situation as it existed at the current time minus the processing time, as nearly the time of the live event in the field of view of the video capture devices 108. For example, the client device may be any one of a personal computer, laptops, tablet, personal data assistant (PDA), cell phone, smart phone, gaming device, and other mobile device.

The client device 164 is operable to receive image data (e.g., video) over the network 140 and is further operable to playback the received image data. A client device 164 may also have functionalities for processing image data. In other examples, image processing functionalities may be shared between the workstation and one or more client devices 164.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting objects, tracking and/or classifying objects located within the captured scene represented by the image data. The processing of the image data may cause modified image data to be produced, such as compressed (e.g. lowered quality) and/or re-encoded image data. The processing of the image data may also cause additional information regarding the image data or objects captured within the images to be outputted. For example, such additional information is commonly understood as metadata. The metadata may also be used for further processing of the image data, such as drawing bounding boxes around detected objects in the image frames.

In some examples, the video security system 100 may be implemented without the workstation 156. Accordingly, image processing functionalities of the workstation 156 may be wholly performed on the one or more video capture devices 108 or on one or more client devices 164. Alternatively, the image processing functionalities may be shared amongst two or more of the video capture devices 108, processing appliance 148 and client devices 164.

Figure 2:
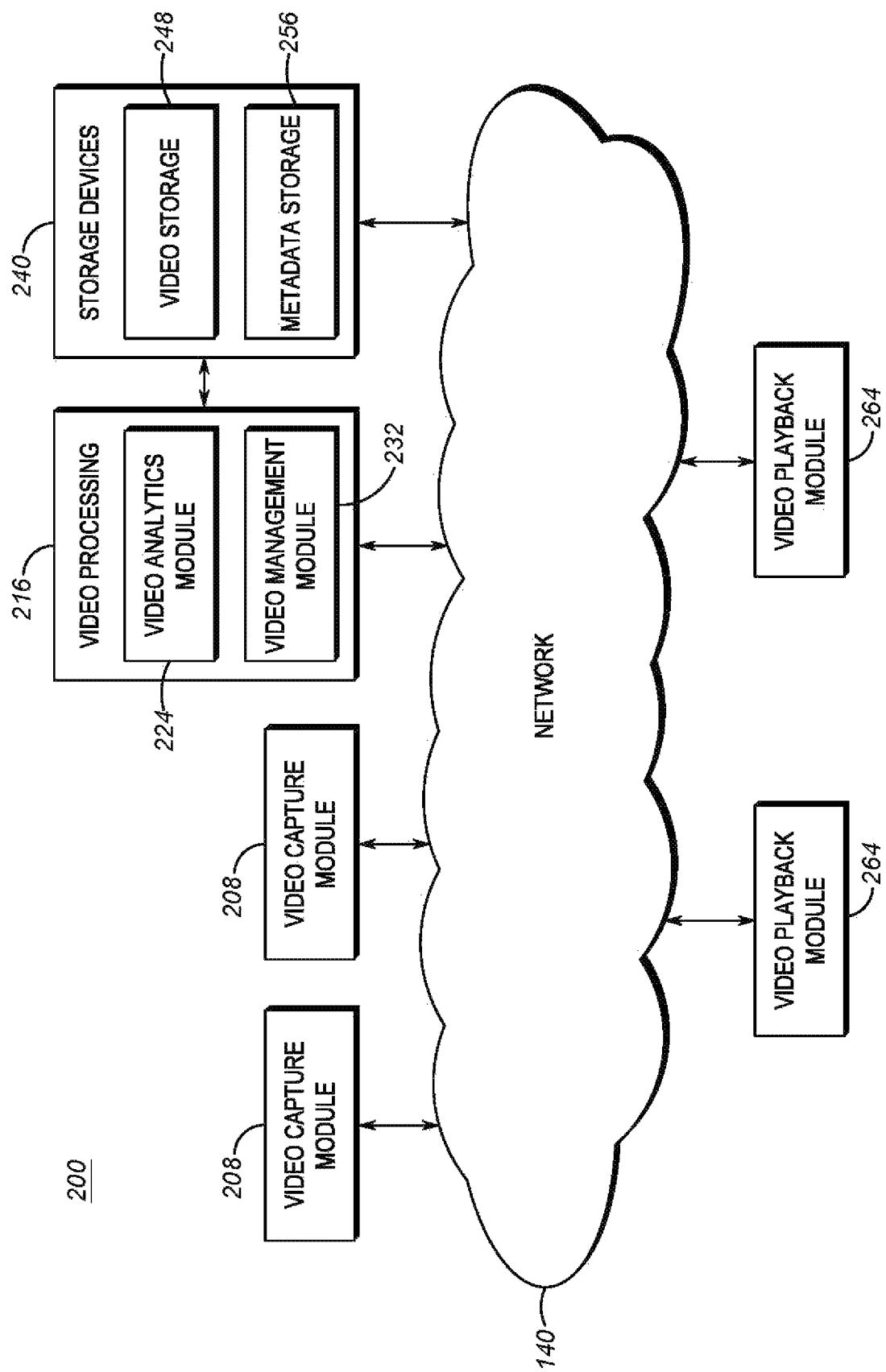
FIG. 2 is a block diagram of a set of operational modules of the video security system according to an example embodiment.

Referring now to FIG. 2, therein illustrated is a block diagram of a set 200 of operational modules of the video security system 100 according to one example embodiment. The operational modules may be implemented in hardware, software or both, on one or more of the devices of the video security system 100 as illustrated in FIG. 2.

The set 200 of operational modules include at least one video capture module 208. For example, each video capture device 108 may implement a video capture module 208. The video capture module 208 is operable to control one or more components (e.g. sensor 116, etc.) of a video capture device 108 to capture image data, for example, video.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 outputs metadata providing information about the determinations including activity or motion detection as will be detailed in FIG. 3 and later Figures. Other examples of determinations made by the video analytics module 224 may include one or more of foreground/background segmentation, object detection, object tracking, motion detection, object classification, object matching, appearance searching, facet matching, virtual tripwire, anomaly detection, facial detection, facial recognition, license plate recognition, identifying objects "left behind", monitoring objects (i.e. to protect from stealing), and business intelligence. However, it will be understood that other video analytics functions known in the art may also be implemented by the video analytics module 224. Video analytics module 224 may use one or more neural networks, such as CNNs.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video security system 100 for storing image data.

It will be understood that according to some example embodiments, the subset 216 of video processing modules may include only one of the video analytics module 224 and the video management module 232.

The set 200 of operational modules further includes a subset 240 of storage modules. For example, and as illustrated, the subset 240 of storage modules include a video storage module 248 and a metadata storage module 256. The video storage module 248 stores image data, which may be image data processed by the video management module 232. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data from each capture device 108 and playback the image data as a video on a display. For example, the video playback module 264 may be implemented on a client device 164 to play recorded video (from storage devices 240) and to play near real time video from the video capture devices 108.

The operational modules of the set 200 may be implemented on one or more of the video capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of a video capture device 108, processing appliance 148 and workstation 156. Similarly, video management functionalities may be split between one or more of a video capture device 108, a processing appliance 148 and a workstation 156.

Figure 3:
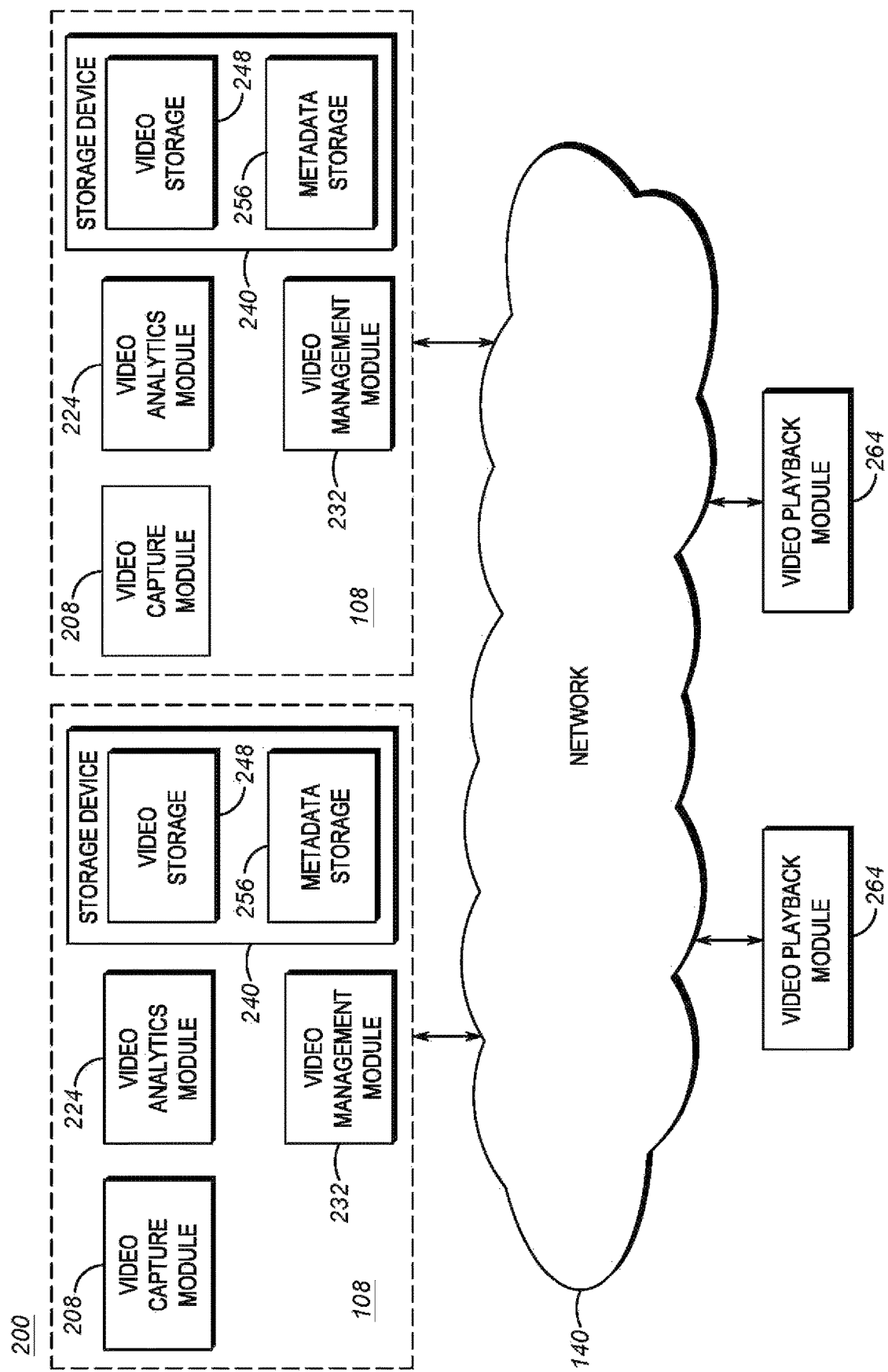
FIG. 3 is a block diagram of a set of operational modules implemented within one device according to an example embodiment.

Referring now to FIG. 3, therein illustrated is a block diagram of a set 200 of operational modules of the video security system 100 according to one particular example embodiment wherein the video capture module 208, the video analytics module 224, the video management module 232 and the storage device 240 is wholly implemented on the one or more video capture devices 108. Accordingly, the video security system 100 may not require a workstation 156 and/or a processing appliance 148.

As described elsewhere herein image data is produced by each of the video capture devices 108. According to various examples, the image data produced is video data (i.e. a plurality of sequential image frames). The video data produced by each video capture device is stored as a video feed within the system 100. A video feed may include segments of video data that have been recorded intermittently. Intermittently recorded video refers to the carrying out of recording of video data produced by a video capture device 108 over an interval of time wherein some of the video data produced by the video capture device 108 is not recorded. Video data produced while recording is being carried out is stored within the system 100 (e.g. within video storage module 248). Video data produced while recording is not being carried out is not stored within the system 100.

For example, whether video data produced by a video capture device 108 is recorded is determined based a set of one or more rules. For example, video data may be recorded based on presence of a feature in the scene captured within the video, such as motion being detected. Alternatively, or additionally, video data may be recorded based on a predetermined recording schedule. Video data may also be selectively recorded based on a command from an operator. Video data may also be recorded continuously (e.g., without interruption) and segments of video data may be extracted from this continuous recording.

Figure 4:
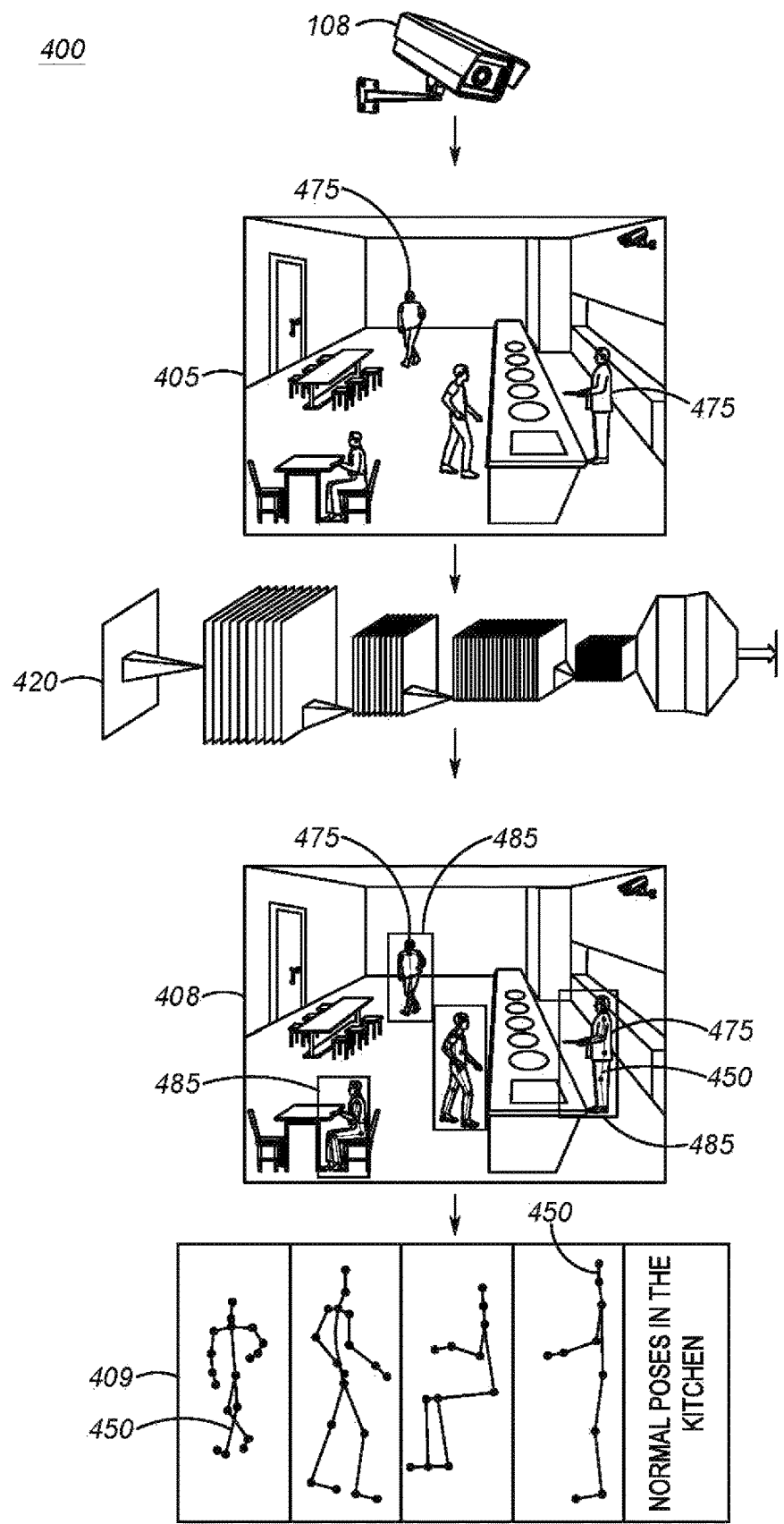
FIG. 4 is a flow chart showing a process of training a system according to an example embodiment.

Referring now to FIG. 4, a method 400 of training a system using a neural network 420 according to an example embodiment begins with receiving video data 405 from the field of view of a video capture device 108. The video data 405 is input into neural network 420. In the example shown, video data 405 represents a field of view overlooking a typical workplace dining area. Neural network 420 may be a convolutional neural network (CNN) operating on a VPU in processor 124, which may be incorporated as part of video capture device 108, or may be external to video capture device 108.

Neural network 420 may be pretrained, for example using Detectron™, PyTorch™ and Caffe2™ software, to allow neural network 420 to detect and process objects 475, such as persons, appearing in the video data 405. A pretrained neural network 420 allows the training process to be unsupervised, i.e. the video data 405 input into neural network 420 does not need to be labelled.

Neural network 420 detects objects 475 in video data 405, places bounding boxes 485 around the detected objects 475, and determines skeletal lines 450 arrayed to follow the skeletal structure of the object and pose vectors 470 for each object 475. In an embodiment, the objects 475 will be people, although in another embodiment animals and their poses can be detected. Pose vectors 470 are vectors that represent the skeletal structure of the objects 475 detected, including the arms (bending at the elbow), legs (bending at the knee), the spine, and the head. The skeletal structure is represented by location coordinates of skeletal lines 450 arrayed to follow the skeletal structure, i.e. pose, of the object 475.

Figure 5:
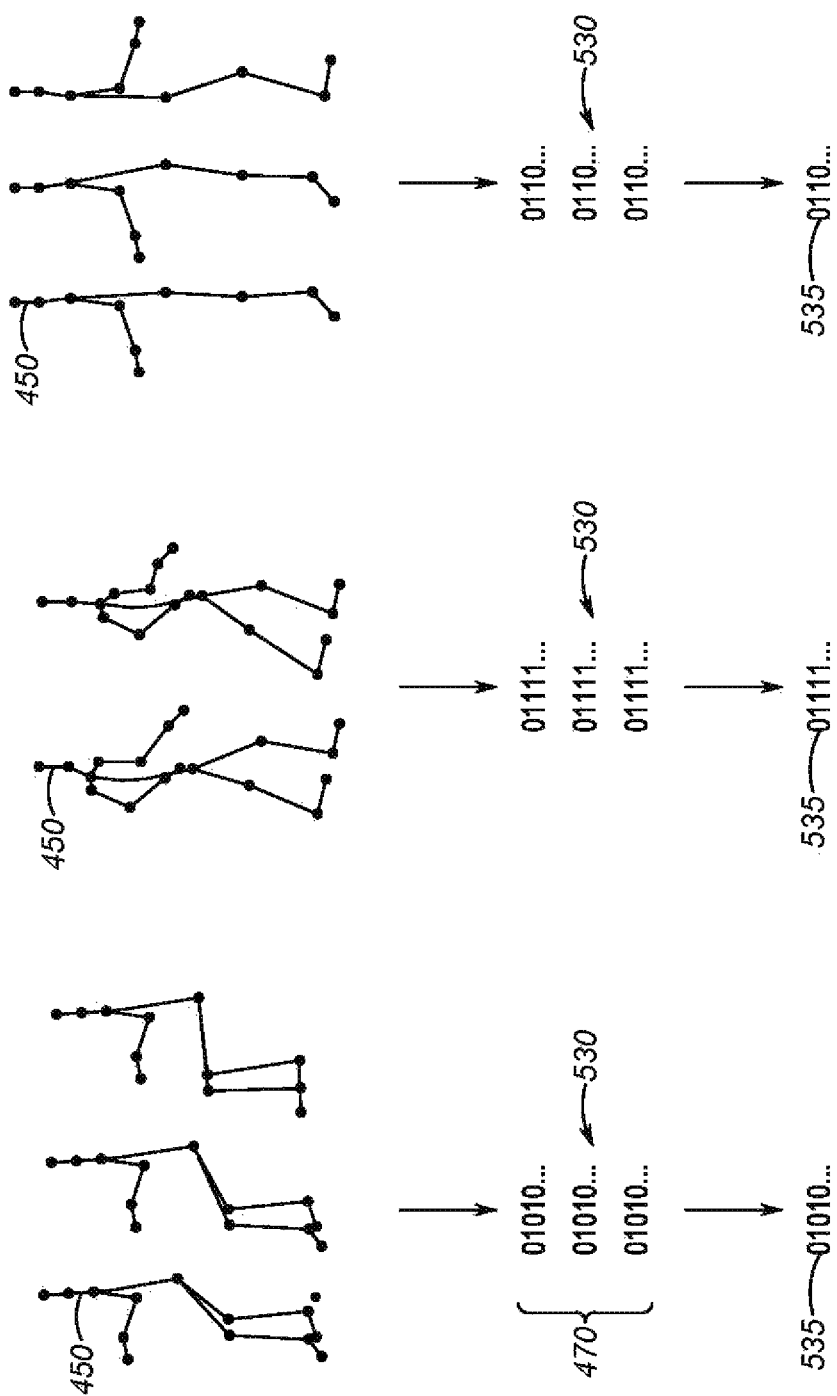
FIG. 5 is a flow chart showing a process of clustering poses according to an example embodiment.

Referring now to FIG. 5, the clustering and determination of typical poses is shown. The collected pose vectors 470 derived from skeletal lines 450 are clustered so that similar poses are placed in the same cluster, using clustering methods such as k-means clustering. Alternative clustering methods include density-based spatial clustering of applications with noise (DBSCAN); clustering which model statistical distribution using an expectation maximization algorithm, for example multivariate Gaussian distributions; hierarchal clustering methods which sub cluster on sub space features; and mean shift clustering. The result, in an embodiment in which, for example, the field of view of video capture device 108 is of a kitchen area of a workplace, may be that sitting poses, standing poses over counters, walking poses into and/or out of the field of view, etc., are each clustered together into separate clusters 530. For a cluster 530 to be considered a normal pose at the conclusion of the training, a minimum number of member pose vectors 470 are considered. This serves to exclude unusual poses, as such poses should be clustered into clusters 530 having few, or even only one, member pose vectors 470. Clusters 530 containing fewer pose vectors 470 than the predetermined number are discarded after the initial clustering stage during training.

As referenced above, the pose vectors 470 are clustered, using for example k-means clustering. This results in n clusters 530, or sets, of pose vectors 470, each having a cluster center 535 and a radius r. The cluster center 535 of each cluster 530 is the average of all pose vectors 470 in that cluster 530. The radius r of each cluster 530 is based on the variance and density of pose vectors 470 in the cluster 530, and for example can be defined as the greatest Euclidean distance of the distances of each pose vector 470 in a cluster 530 from the cluster center 535 of that cluster 530.

Figure 6:
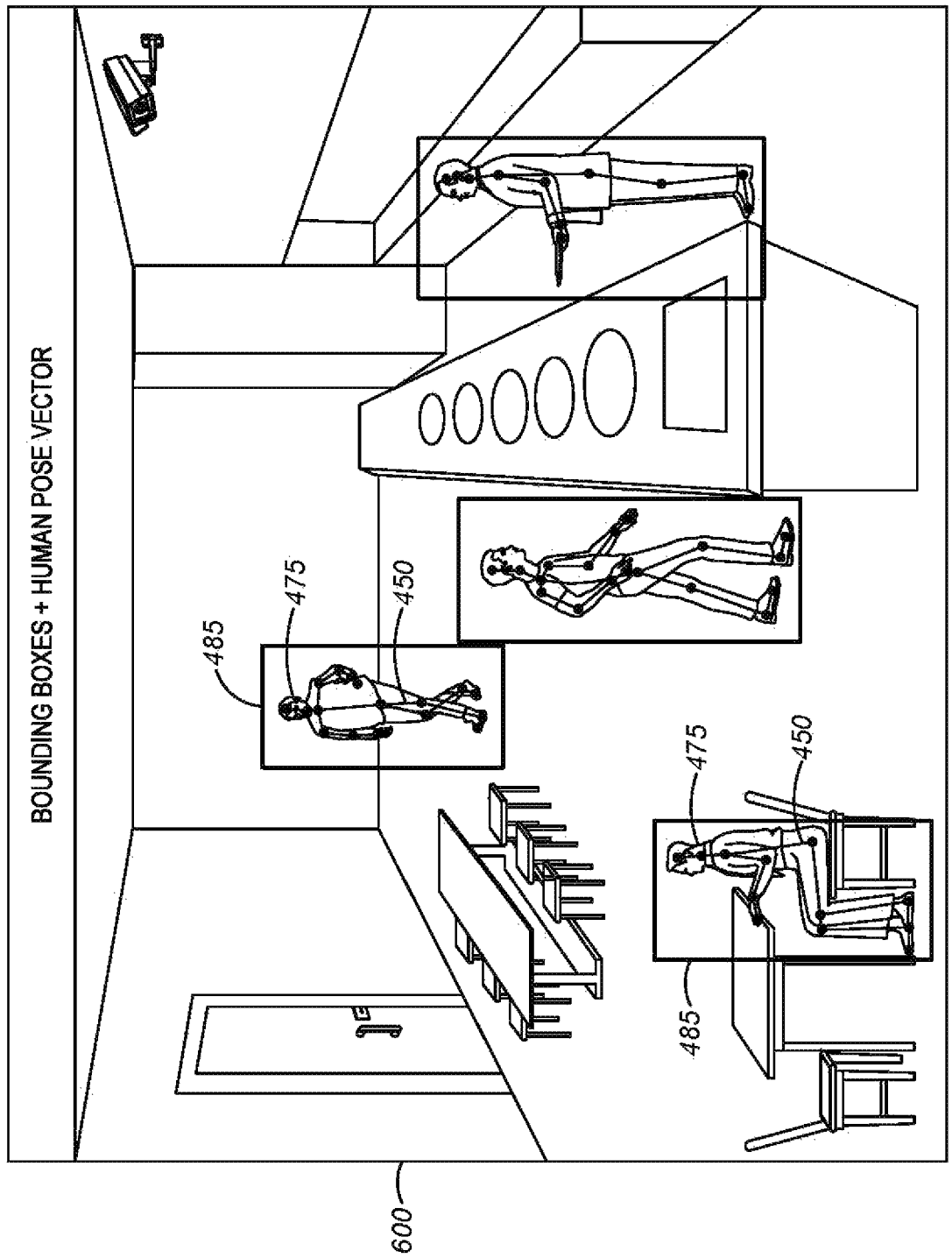
FIG. 6 is a display of video data generated by a video security system according to another example embodiment.

Referring now to FIG. 6, a frame 600 of video data 405 is shown after processing for training by neural network 420. Objects 475, in this case people, are shown in frame 600. Skeletal lines 450 are shown in each bounding box 485, for use in determination of pose vectors 470.

After the training process is concluded, which may take hours or days, the system is ready for deployment.

Figure 7:
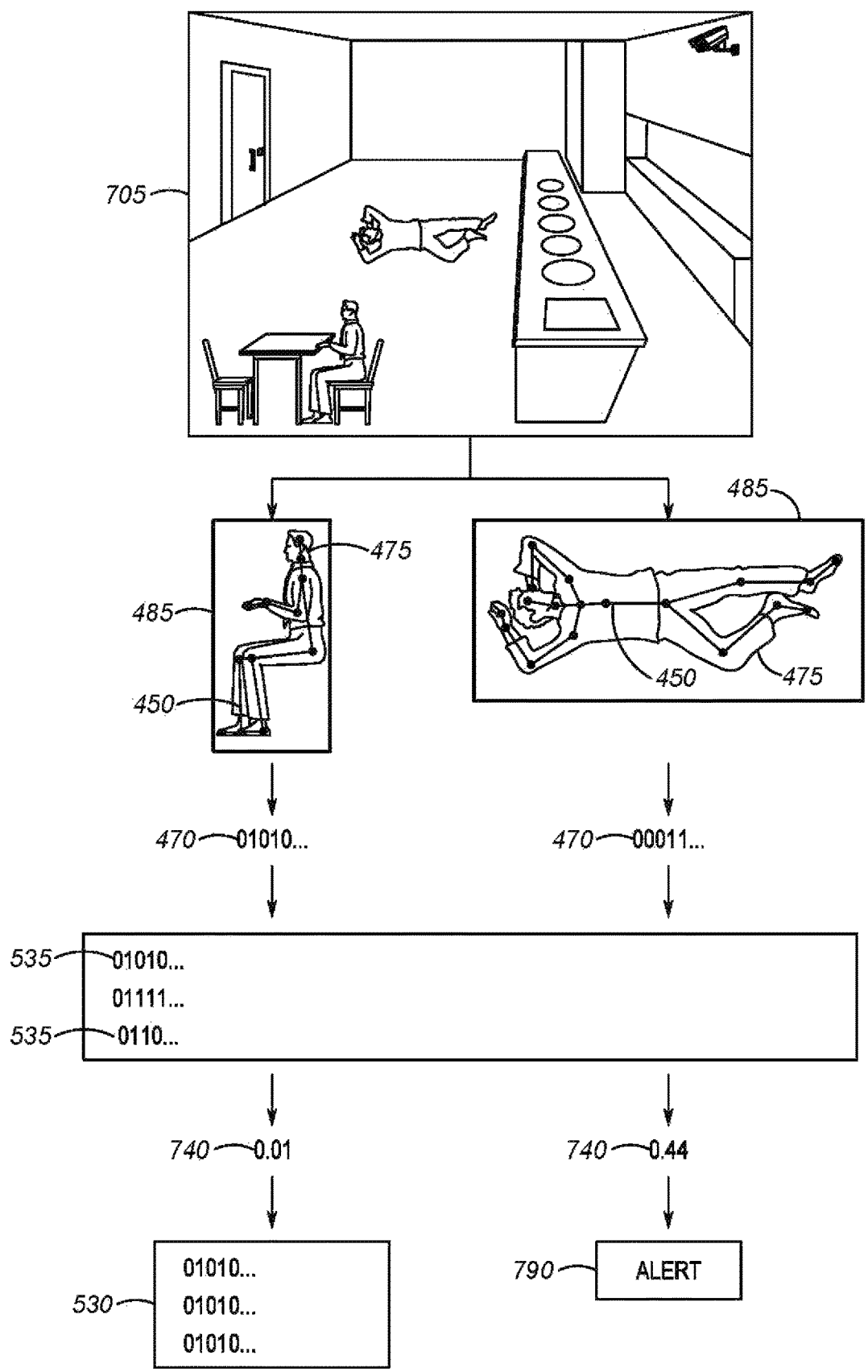
FIG. 7 is a flow chart showing a process of determining an anomalous pose according to an example embodiment.

Referring now to FIG. 7, a flow chart is shown showing the processing of a frame of video after training has concluded. Once neural network 420 is trained, it can be used to detect anomalous behavior. For incoming video data 705, objects 475 are detected, and bounding boxes 485, skeletal lines 450, and pose vectors 470 determined for each object 475.

The pose vector 470 is then compared to each cluster 530, for example by comparing each pose vector 470 to the cluster center 535 of each cluster 530 to determine similarity. The Euclidean distance 740 between each pose vector 470 and cluster center 535 is calculated and normalized, producing a value from [0,1] for each cluster center 535. Alternatively, the distance calculated is not normalized. If the Euclidean distance exceeds a value based on the radius r for each cluster 530, the pose associated with the pose vector 470 is designated as anomalous and an alert 750 generated.

The value based on the radius r can be the radius r itself, or the value can be adjusted depending on how strictly to define anomalous. For example, a value >r can be selected, such as 1.2*r, which would result in fewer poses being designated as anomalous, or a value <r can be selected, such as 0.5*r, which would result in more poses being designated as anomalous.

Figure 8:
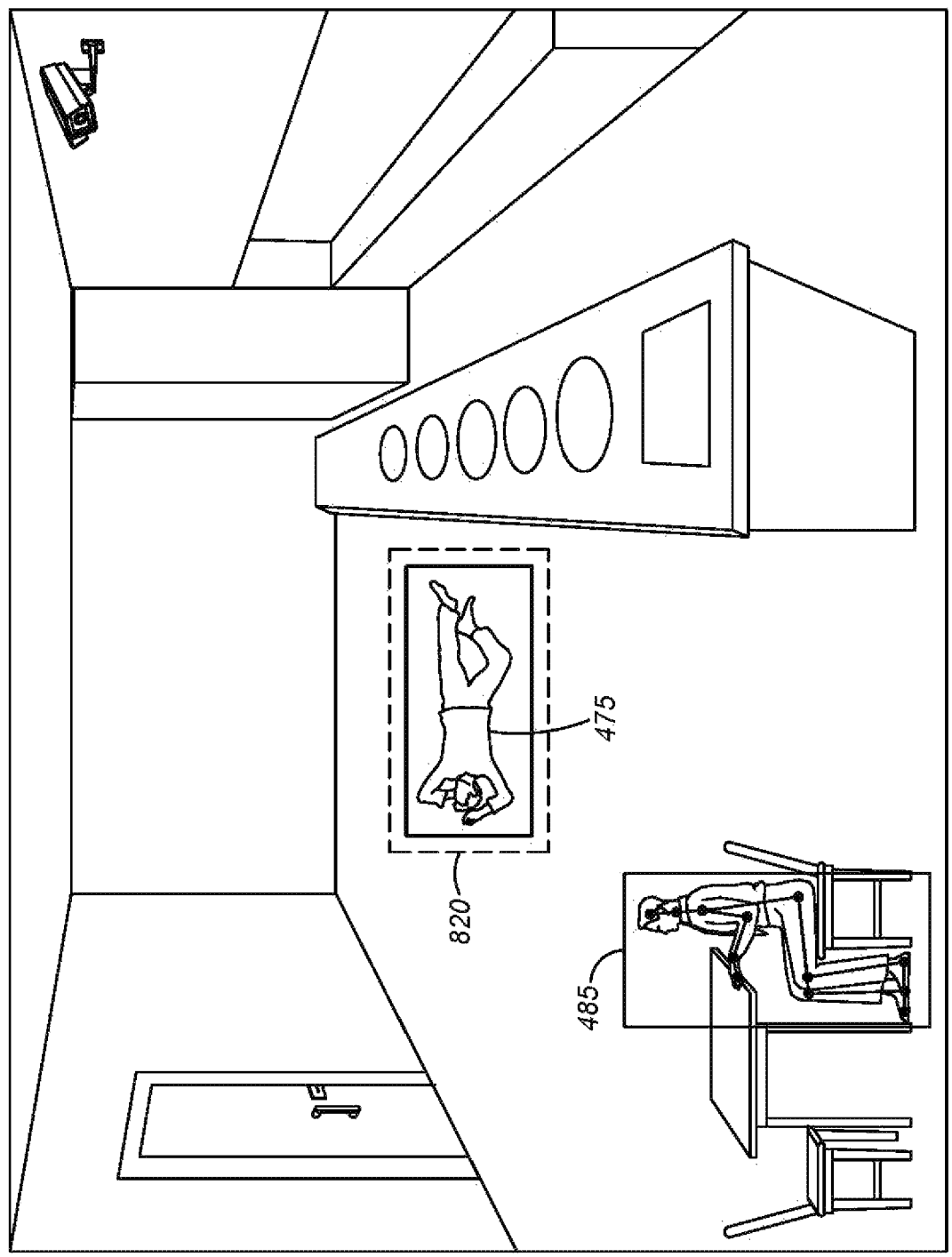
FIG. 8 is a display of video data showing the detection of an anomalous pose according to an example embodiment.

With reference to FIG. 8, the alert may be a visual indicator 820, such as a different colored or flashing bounding box, or may be indicated using a focus of attention feature in a video management system. A message, for example a text message, email or other message, may be sent, which may include a video excerpt showing the pose, or an image of the person in the pose, to one or more devices, such as cellular phones, radios, workstations, or the like. An auditory indicator may also be used to indicate an alarm.

If the pose vector 470 is less than or equal to a value based on the Euclidean distance from a particular cluster 530, the pose vector 470 is considered to be similar to the pose vectors 470 already in that cluster 530 and may be added to the cluster 530. If the pose vector 470 is less than the Euclidean distance for more than one cluster 530, the pose vector 470 may be added to the cluster 530 to which it is the most similar (i.e. has the lowest Euclidean distance from). Thus, during operation, the clusters 530 are updated during operation. New cluster centers 535 may be generated periodically, or the generation of a new cluster center 535 may be triggered by certain events, for example the addition of a new pose vector 470 to the cluster 530.

Figure 9:
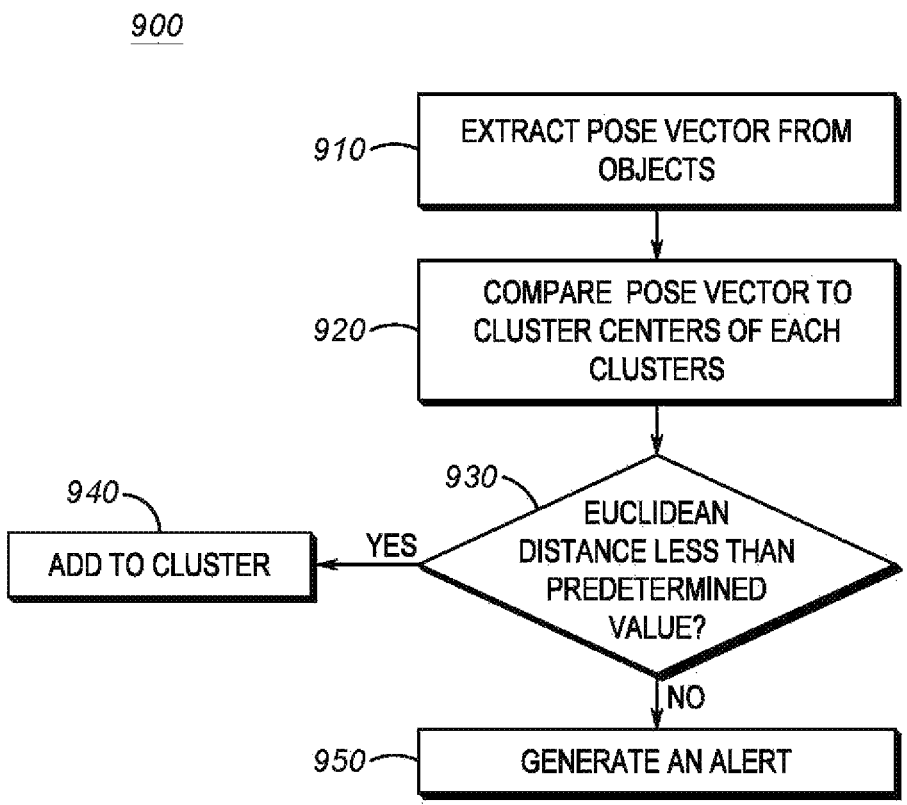
FIG. 9 is a flow chart showing the decision process of determining when a pose is anomalous according to an example embodiment.

Referring now to FIG. 9, a flow chart is shown showing the processing 900 of pose vectors 470 according to an example embodiment. At block 910, as described above, pose vectors 470 are generated from objects 475, for example by using skeletal lines 450. At block 920, each pose vector 470 is compared to each cluster 530, for example by calculating the Euclidean distance between the pose vector 470 and the cluster center 535 of each cluster 530. At block 930 each calculated Euclidean distance is compared to a predetermined value as described above. If the value of the Euclidean distance is less than the predetermined amount, indicating that the pose vector 470 is similar to the cluster center 535, then at block 940, the pose vector is added to the cluster 530 and the cluster center 535 of that cluster 530 is recalculated. If the value of the Euclidean distance is greater than a predetermined amount for each cluster center 535, then at block 950, an alert is generated.

Figure 10:
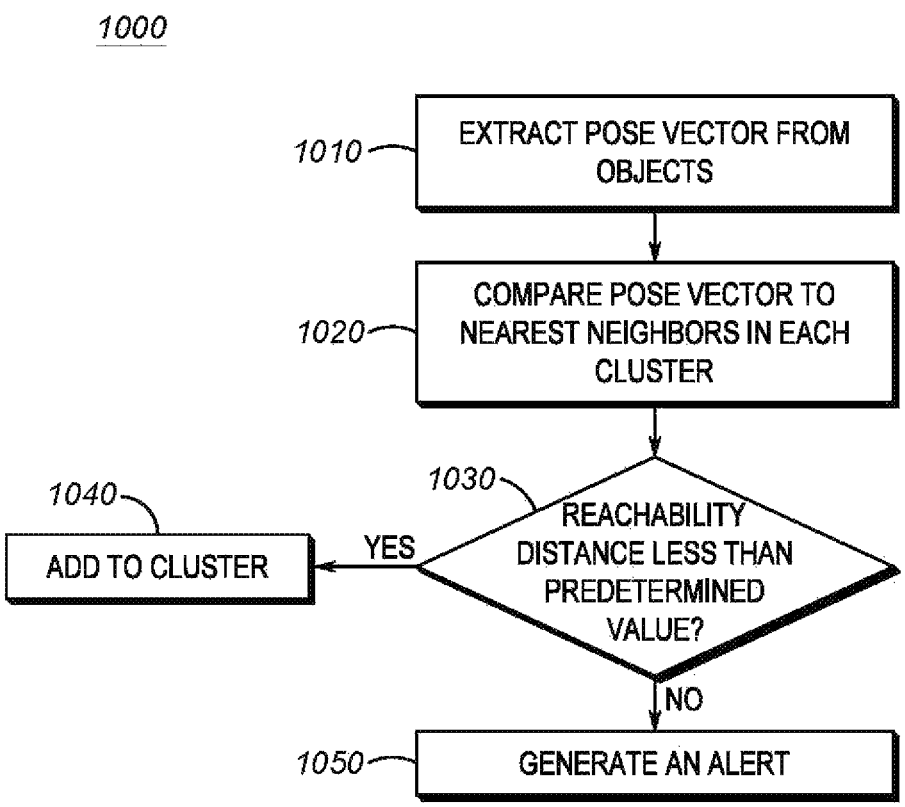
FIG. 10 is a flow chart showing the decision processing of determining when a pose is anomalous according to another example embodiment.

Referring now to FIG. 10, a flow chart is shown showing the processing 1000 of pose vectors 470 according to another example embodiment using an outlier factor algorithm. The local outlier factor is based on local density, where the distance of a particular pose vector 470 from its nearest neighboring pose vectors 470 is used to estimate a density of pose vectors 470. A pose vector 470 having a similar density as its neighbors is considered to be in a cluster, and pose vectors 470 having a low density compared to its nearest neighbors are considered outliers, i.e. anomalous. The local density is estimated by the typical distance at which a point can be "reached" from its neighbors. This "reachability distance" adds density of a cluster as a consideration.

At block 1010, as described above, pose vectors 470 are generated from objects 475, for example by using skeletal lines 450. At block 1020, each pose vector 470 is compared to each cluster 530, for example by calculating the reachability distance between the pose vector 470 and its nearest neighboring pose vectors 470 in each cluster 530. At block 1030 each calculated reachability distance is compared to a predetermined value as described above. If the value of the reachability distance is less than the predetermined amount for a cluster 530, indicating that the pose vector 470 is similar to the neighboring pose vectors 470, then at block 1040, the pose vector is added to the cluster 530. If the reachability distance is greater than a predetermined amount for each cluster 530, then at block 1050, an alert is generated.

Figure 11:
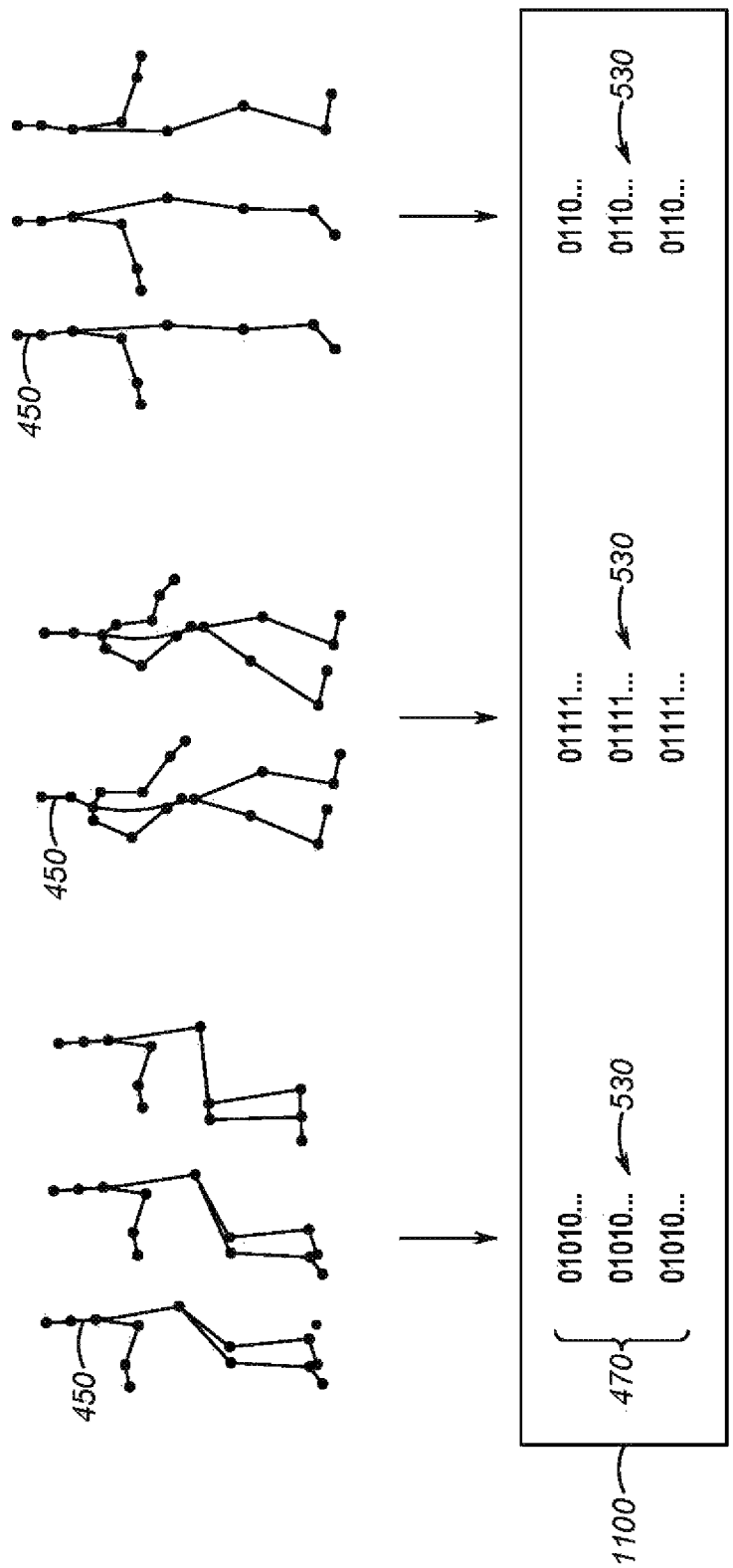
FIG. 11 is a flow chart showing a process of clustering poses according to another example embodiment.

With reference to FIG. 11, illustrating a flow diagram according to an example embodiment in which an expectation maximization model is used, instead of, for example, K-means clustering. The expectation maximization model will produce a probability that a pose vector 470 belongs in dataset 1100, i.e. the probability that the pose vector is not an outlier. As shown in FIG. 11, during training, pose vectors 470 are added to dataset 1100 and organized into clusters using the expectation maximization algorithm. The expectation maximization model defines probability distributions of the pose vectors 470 in dataset 1100, and computes probabilities of cluster 530 memberships based on the probability distributions. The goal of the expectation maximization model algorithm is to maximize the overall probability of a vector 470 being in a cluster.

Expectation Maximization clustering estimates the means and standard deviations of each cluster to maximize the likelihood of the pose vectors 470 distribution of clusters 530 in dataset 1100. The Expectation Maximization algorithm does not compute actual assignments of pose vectors 470 to clusters, but computes probabilities of each vector 470 belonging to a cluster 530. In other words, each pose vector 470 has a probability of belonging to each cluster 530. Each cluster 530 can be considered to contain the vectors 470 which have the highest probability of belong to that cluster 530 relative to the other clusters 530.

Figure 12:
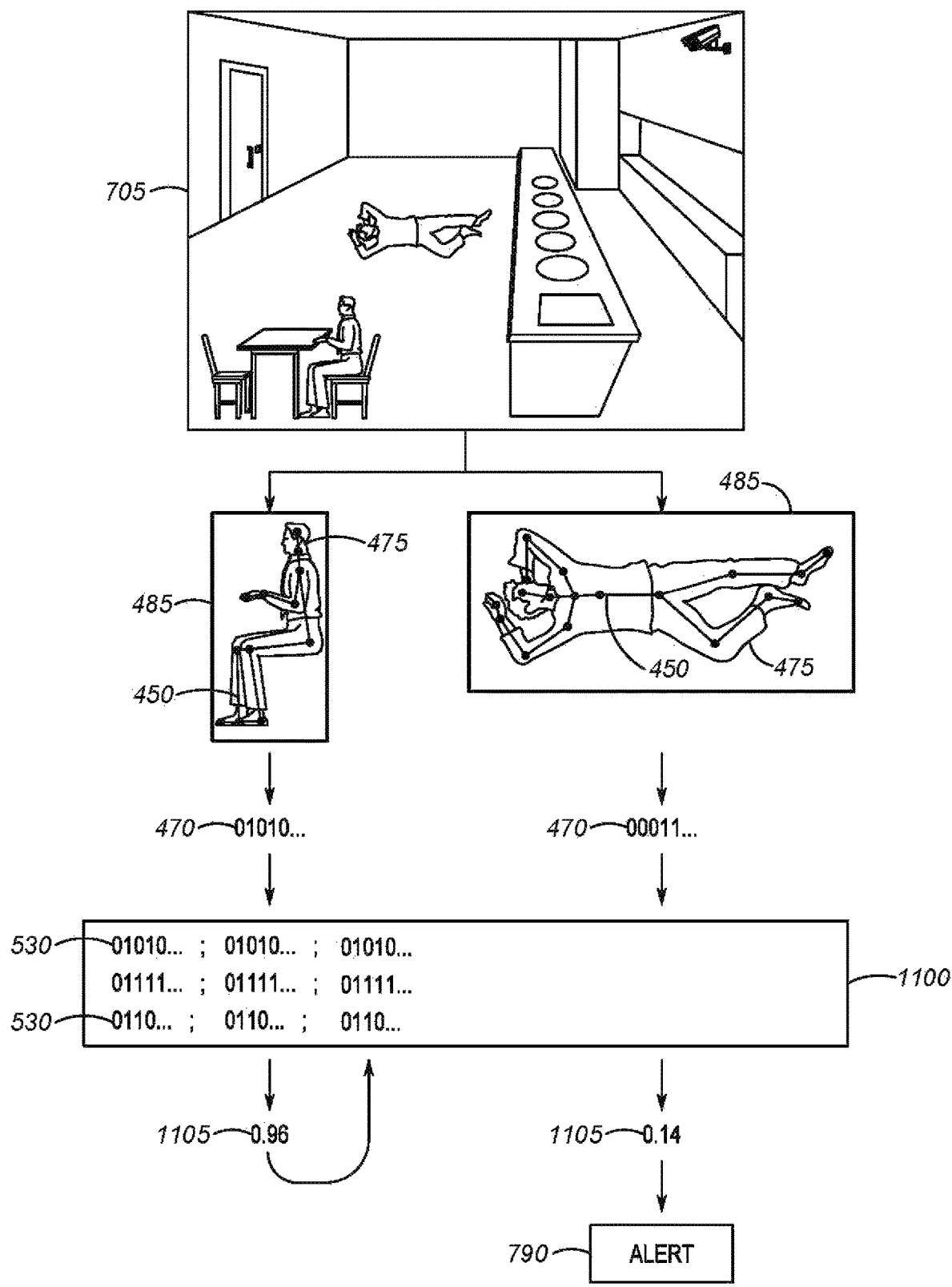
FIG. 12 is a flow chart showing a process of determining an anomalous pose according to another example embodiment.

With reference to FIG. 12, as described above, observed pose vectors 470 after training are generated and compared to clusters 530, and a probability of pose vector 470 belong to each cluster 530 is generated. These probabilities are summed and normalized and a probability 1105 of pose vector 470 being a member of a cluster 530 in dataset 1100 is generated.

If the probability that pose vector 470 is a member of any cluster 530 is less than a predetermined value, the pose associated with the pose vector 470 is designated as anomalous and an alert 790 generated. If the probability is greater than the predetermined value, then the pose vector is added to dataset 1100.

Figure 13:
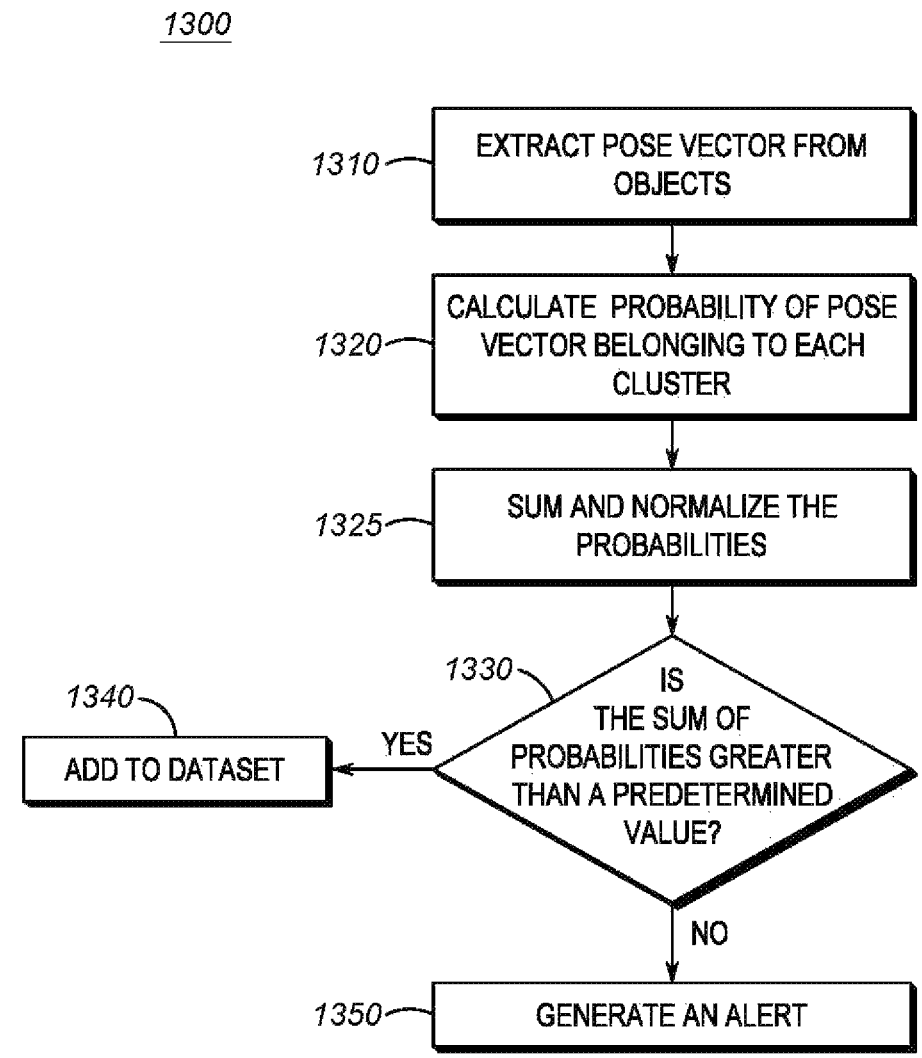
FIG. 13 is a flow chart showing the decision process of determining when a pose is anomalous according to another example embodiment.

Referring now to FIG. 13, a flow chart is shown showing the processing 1300 of pose vectors 470 according to another example embodiment. At block 1310, as described above, pose vectors 470 are generated from objects 475, for example by using skeletal lines 450. At block 1320, each pose vector 470 is compared to each cluster 530, for example by determining the likelihood that the pose vector 470 is part of each cluster 530. At block 1325, the probabilities are summed and normalized, and a probability of pose vector 470 belonging to any cluster 530 is generated.

At block 1330 the probability of pose vector 470 belonging to any cluster 530 is compared to a predetermined value. It the probability of pose vector 470 belonging to a cluster 530 is greater than a predetermined probability, then at block 1350, the pose vector 470 is added to dataset 1100. It the probability of pose vector 470 belonging to a cluster 530 is less than the predetermined probability, then at block 1350, an alert is generated.

The system and method as described herein can be used to detect unusual poses, such as a person holding a gun, laying on the ground, or a person engaged in a fight, none of which include usual poses in many settings, for example an office, or a commercial setting. Other anomalous human poses may include people ducking for cover or crawling, cutting a fence line, or being struck by an object, such as a car, etc.

In an embodiment, a user can provide feedback regarding a particular pose, for example by indicating a pose represents a level of danger or that a pose, while perhaps anomalous, does not indicate danger. For example, a sliding danger scale can be used to designate a danger level associated with an object in a bounding box, in which the selected level on the scale can be related to the predetermined value used in comparing the Euclidean distance. In such an embodiment, the greater the danger level indicated, the lower the value of the modifier multiplied by r to set the predetermined value. In the case of a pose indicated as dangerous, the associated pose vector 470 may be treated as a new pose cluster 530, and pose vectors 470 with a Euclidean distance within the predetermined value will be flagged as dangerous, and may be associated with a particular alert or alarm. Likewise, in the case of an anomalous pose marked as safe by a user, the associated pose vector can be treated as the start of a new cluster 530, and later detected pose vectors 470 within a Euclidean distance of the safe pose vector, can be added to the new cluster 530.

In an embodiment, when a pose is marked as an anomaly either by the system, or alternatively by a user, an appearance search through stored video footage can be run based on the pose to determine other appearances of the pose in recorded video footage, which can then be brought to a user's attention.

In an embodiment, labels associated with an object in a pose can be added to the image of an object within a bounding box. The labels may be generated by a user, or by using a neural network, or by comparing vectors to available pose templates. If the pose vector 470 associated with the labelled object is placed into or is part of a cluster 530, all pose vectors 470 forming part of, or added to, the particular cluster 530 can be given the same label, which can be added to the metadata related to the object. If the pose vector 470 associated with the object is anomalous, the pose vector 470 may be treated as the start of a new cluster 530, and any additional pose vectors 470 added to the new cluster 530 are treated as anomalous and the associated objects given the label.

In an embodiment, clusters 530 may be associated with time of day and/or day of week periods. For example, certain poses may be common at certain times of day, but anomalous at other times. For example, resting poses may be common at night, but anomalous during the day. In this embodiment clusters 530 are also associated with a day and/or time interval. Clusters 530 associated with a day or time interval outside of the time and day associated with a pose vector 470 being compared to clusters 530, are not considered when determining if a pose is anomalous.

In another embodiment users may be able to configure poses, for example by manipulating skeletal lines 450, thus defining a pose. Pose vectors 470 associated with such skeletal lines 450 may be labelled as described above and may be flagged as dangerous or anomalous as described above. Other options by which a user can configure poses could include defining ranges of angles between specified joints in the skeletal lines 450, or selection of metadata associated with leg and/or arm positions.

The anomaly detection may detect anomalies of a scene using metadata from the video. Alternatively, the anomaly detection can be performed separately from metadata generation. Thus, the anomaly detection may be performed in real time using metadata extracted contemporaneously with the recording of the video, or may be performed with respect to previously recorded video (e.g., video taken days, months, or years before).

Numerous specific details are set forth in order to provide a thorough understanding of the exemplary embodiments described herein. The invention may, however, be embodied in many different forms and should not be construed as limited to the exemplary embodiments set forth herein. These example embodiments are just that—examples—and many different embodiments and variations are possible that do not require the details provided herein. It should also be emphasized that the disclosure provides details of alternative examples, but such listing of alternatives is not exhaustive. Furthermore, any consistency of detail between various exemplary embodiments should not be interpreted as requiring such detail—it is impracticable to list every possible variation for every feature described herein. The language of the claims should be referenced in determining the requirements of the invention.

As should be apparent from this detailed description, the operations and functions of an electronic computing device, such as processor 124, are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors 124 (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of detecting anomalous poses, comprising: detecting a living object of interest in a field of view of a video camera;
generating, by a neural network, a pose vector associated with a pose of the living object of interest;
comparing the pose vector of the living object of interest to one or more clusters of pose vectors in a dataset of pose vectors, each cluster of pose vectors comprising one or more pose vectors generated from poses of living objects found in the field of view of the video camera;
determining a value associated with the similarity of the pose vector of the living object of interest to at least one of the one or more pose vectors comprising a cluster of pose vectors, wherein determining the value associated with the similarity of the pose vector of the living object of interest to at least one of the one or more pose vectors comprising a cluster of pose vectors comprises determining an Euclidean distance, wherein the Euclidean distance is determined using the pose vector of the living object of interest and a cluster center of each of the clusters of pose vectors;
comparing the value associated with a similarity of the pose vector of the living object to at least one of the one or more pose vectors comprising a cluster of pose vectors to a predetermined value; and
based on the comparing the value associated with the similarity of the pose vector of the living object to at least one of the one or more pose vectors comprising a cluster of pose vectors to the predetermined value, adding the pose vector to the dataset of pose vectors or generating an alert, wherein if the pose vector of the living object of interest is added to the dataset of pose vectors, the pose vector is added to a cluster of the one or more clusters of pose vectors, and the cluster center of the cluster is recalculated.

2. The method of claim 1 wherein the one or more clusters of pose vectors are formed using k-means clustering of a plurality of pose vectors in the dataset of pose vectors.

3. The method of claim 1 wherein each of the one or more clusters of pose vectors is associated with a label.

4. The method of claim 1 wherein the pose vector of the living object of interest is associated with a time, and each of the one or more clusters of pose vectors are associated with a time period, and if the time is outside the time period associated a cluster, the cluster is not compared to the pose vector of the living object.

5. The method of claim 1 wherein determining the value associated with the similarity of the pose vector of the living object of interest to at least one of the one or more pose vectors comprising a cluster of pose vectors comprises determining a reachability distance.

6. The method of claim 5 wherein the reachability distance is determined using the pose vector of the living object of interest and its nearest neighboring pose vectors in each of the clusters of pose vectors.

7. The method of claim 1 wherein the one or more clusters of pose vectors are formed using k-means clustering of a plurality of pose vectors in the dataset of pose vectors.

8. The method of claim 1 wherein determining the value associated with the similarity of the pose vector of the living object of interest to at least one of the one or more pose vectors comprising a cluster of pose vectors comprises determining a probability of the pose vector of the living object belonging to the cluster of pose vectors.

9. The method of claim 8 wherein the probability is determined using an expectation maximization algorithm.

10. A system comprising:
a display;
an input device;
a processor communicatively coupled to the display and the input device; and
a memory communicatively coupled to the processor and having stored thereon computer program code that is executable by the processor, wherein the computer program code, when executed by the processor, causes the processor to
   detect a living object of interest in a field of view of a video camera;
   generate, by a neural network, a pose vector associated with a pose of the living object of interest;
   compare the pose vector of the living object of interest to one or more clusters of pose vectors in a dataset of pose vectors, each cluster of pose vectors comprising one or more pose vectors generated from poses of living objects found in the field of view of the video camera;
   determine a value associated with a similarity of the pose vector of the living object of interest to at least one of the one or more pose vectors comprising a cluster of pose vectors wherein the determination of the value associated with the similarity of the pose vector of the living object of interest to at least one of the one or more pose vectors comprising a cluster of pose vectors comprises determining an Euclidean distance, wherein the Euclidean distance is determined using the pose vector of the living object of interest and a cluster center of each of the clusters of pose vectors;
   compare the value associated with the similarity of the pose vector of the living object to at least one of the one or more pose vectors comprising a cluster of pose vectors to a predetermined value; and
   based on the comparison of the value associated with the similarity of the pose vector of the living object to at least one of the one or more pose vectors comprising a cluster of pose vectors to the predetermined value, add the pose vector to the dataset of pose vectors or generating an alert, wherein if the pose vector of the living object is added to the dataset of pose vectors, the pose vector is added to a cluster of the one or more clusters of pose vectors, and the cluster center of the cluster is recalculated.

11. The system of claim 10 wherein the determination of the value associated with the similarity of the pose vector of the living object of interest to at least one of the one or more pose vectors comprising a cluster of pose vectors comprises determining a reachability distance.

12. The system of claim 11 wherein the reachability distance is determined using the pose vector of the living object of interest and its nearest neighboring pose vectors in each of the clusters of pose vectors.

13. The system of claim 10 wherein the determination of the value associated with the similarity of the pose vector of the living object of interest to at least one of the one or more pose vectors comprising a cluster of pose vectors comprises determining a probability of the pose vector of the living object belonging to the cluster of pose vectors using an expectation maximization algorithm.

* * * * *